(No Model.) 2 Sheets—Sheet 1.
L. PORTER.
JOURNAL BEARING FOR CAR TRUCKS.
No. 495,189. Patented Apr. 11, 1893.
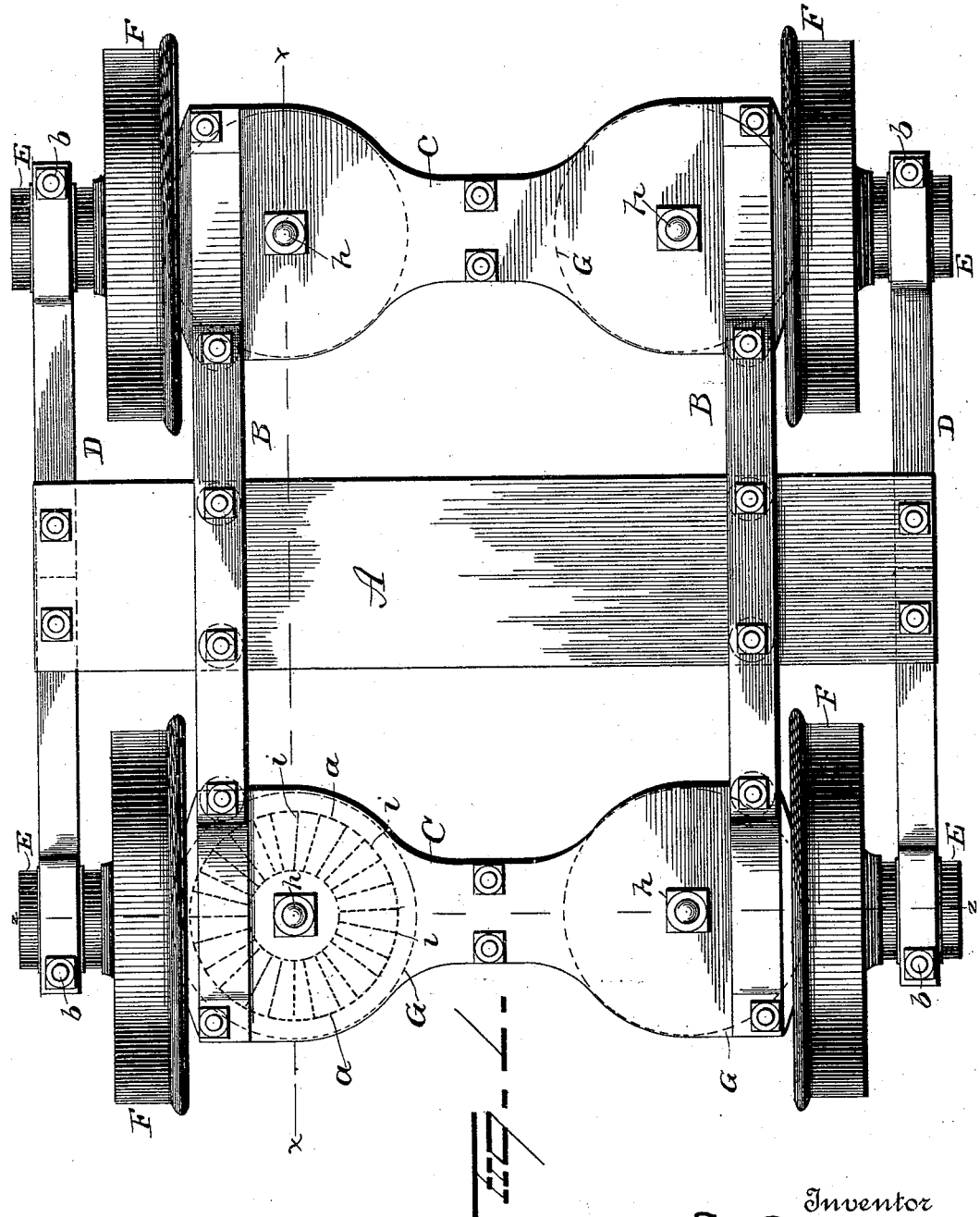
Witnesses
E. I. Nottingham
G. F. Downing.
Inventor
L. Porter,
By H. A. Seymour.
Attorney (No Model.) 2 Sheets—Sheet 2.
L. PORTER.
JOURNAL BEARING FOR CAR TRUCKS.
No. 495,189. Patented Apr. 11, 1893.
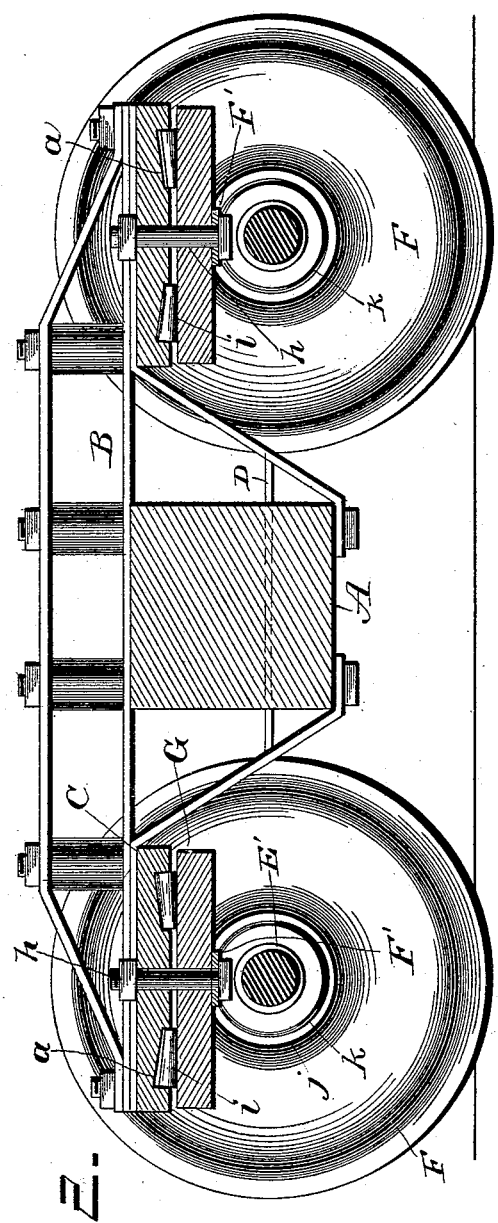
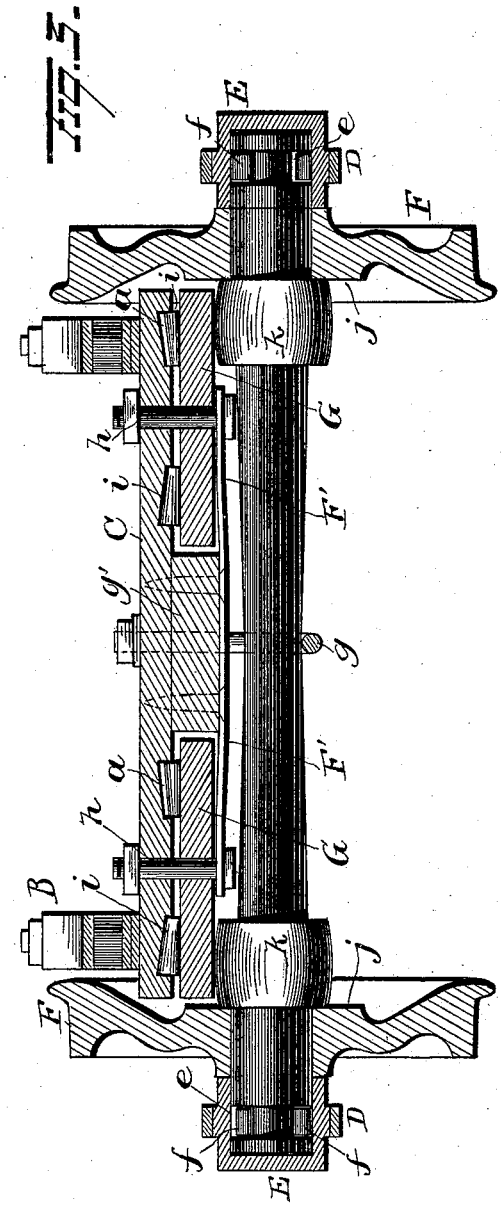
Witnesses
E. W. Nottingham
G. F. Downing.
Inventor
L. Porter.
By H. A. Sympson.
Attorney

UNITED STATES PATENT OFFICE.

LANSING PORTER, OF AUBURN, NEW YORK.

JOURNAL-BEARING FOR CAR-TRUCKS.

SPECIFICATION forming part of Letters Patent No. 495,189, dated April 11, 1893.

Application filed November 15, 1892. Serial No. 452,078. (No model.)

*To all whom it may concern:*

Be it known that I, LANSING PORTER, a resident of Auburn, in the county of Cayuga and State of New York, have invented certain new and useful Improvements in Journal-Bearings; and I do hereby declare the following to be a full, clear, and exact description of the invention, such as will enable others skilled in the art to which it appertains to make and use the same.

My invention relates to an improvement in journal bearings,—its object being to construct the bearings for a car axle (or other revoluble device) in such manner that it will theoretically be free from friction and run without the use of oil.

A further object is to provide devices whereby to effectually receive the forward and backward pressure caused by starting and stopping of the car,—on grades and by the brakes.

A further object is to produce a bearing for a car axle, which shall be simple in construction and effectual in the performance of its functions.

With these objects in view the invention consists in certain novel features of construction and combinations and arrangements of parts as hereinafter set forth and pointed out in the claims.

In the accompanying drawings: Figure 1 is a plan view of a truck embodying my improvements. Fig. 2 is a sectional view, on the line $x$—$x$ of Fig. 1. Fig. 3 is a sectional view on the line $z$—$z$ of Fig. 1.

A represents a bolster, to which the side braces of truss bars B are secured. To the ends of the braces B, horizontal plates C are secured, the under face of each of which in proximity to its ends, is made with a circular recess $a$ for a purpose which will be presently explained.

To the ends of the bolster A bars D are secured. Each bar D may be made in two sections and the inner ends of each section of each bar D are firmly attached in any suitable manner to the ends of the bolster and the outer ends are bifurcated or bent to receive journal boxes E, a bolt $b$ being employed to connect the forked ends of the bars D and adapted to retain the journal boxes in position. Each box E is a simple thimble with a closed end and, internally, is an exact circle. Projecting into the boxes E are the ends of the axles E' of the truck, each of which is made with an annular recess $e$. Rollers $f$ of alternately varying sizes, operate in the recesses $e$ and against the inner walls of the boxes E, said recesses in the axle being slightly less in depth than the diameters of the largest rollers. The ends of these rollers are entirely free from pressure, friction and wear, as ample provision is made elsewhere for receiving the side thrust.

By the employment of the construction and arrangement of bearings above described, efficient means will be provided for receiving the forward and backward pressure caused by starting and stopping,—by grades and by the brakes. The boxes E are held rigidly in position simply by the horizontal bars D to the bolster, no provision being made for vertical pressure on said bearings, as they are to receive none.

Car wheels F are secured to the axles E' in proximity to the journal boxes E. I prefer to use wheels in which the inside face is concave and the outside face convex, so that the weight which will be brought to bear on the axle between the wheels, will be thrown very nearly vertical over the rails. A yoke $g$ is secured to each plate C and embraces the axles E'. On the under side of each plate C a block $g'$ is located, being either made integral therewith or secured thereto, as desired. To each of the blocks $g'$, a plate or bar F' is secured and extends to points about coincident with the centers of the circular recesses $a$ in the under faces of the plates C, where they are perforated for the reception of bolts $h$. The bolts $h$ also pass through the plates C and have disks G loosely mounted on them,— said bolts being screwthreaded on their ends for the reception of suitable nuts. The disks G are made with plain, flat top and bottom faces and between said disks and in the recesses $a$ of the plates C, circular series of rollers $i$, of varying sizes, are located. The peripheries of the disks are adapted to run on a circular shoulder $j$ on the inner face of the wheels. Thus it will be seen that the disks G will be located between the wheels of the truck,—receive motion from the same and that the side thrust will be received by the shoulders *j* on the wheels. The bottom faces of disks G bear upon collars *k* made integral with or secured to the axles E', said collars being of sufficient thickness so that a straight bar or plate F' can connect the lower ends of the disk bolts without contact with the rotary shaft or axle.

It has heretofore been maintained that the under face of the disk and the collar on the shaft ought to be cone-shaped and constructed at such an angle as to avoid movement between the contact faces of said parts. But it is obvious that the immense weight on such an incline would result in constant and severe pressure against the center bolt of the disk. For this reason I prefer to employ a disk having a flat or horizontal face; and by making the face of the collar *k* that engages the disk, very slightly curved or spherical in form, it will be impossible for the disk to rest on the whole width of the collar at any one time, thereby diminishing the twisting movement and friction between the parts, and also result in a free and easy movement of the whole truck in the twisting it receives from the inequalities in the rails.

By constructing and arranging bearings between the wheels as above described, a single stationary plate employed between each pair of wheels will cover both disks and will extend from wheel to wheel, each end being held rigidly in position by truss irons or braces from the bolster. The groove for the rollers (or spheres if it be desired to employ the same) will be wholly in the under face of the stationary plate, leaving the upper face of the disk a horizontal plane to avoid the accumulation of dirt. This leaves the disks G simple plates of steel, smooth on both faces and of uniform thickness throughout.

Having fully described my invention, what I claim as new, and desire to secure by Letters Patent, is—

1. The combination with a stationary plate, a shaft or axle and wheels carried by the latter, of revoluble disks carried by said stationary plate and adapted to bear against the inner faces of the wheels, and tapering rollers inserted between said stationary plate and the disks, substantially as set forth.

2. The combination with a stationary plate, a shaft or axle and wheels carried by the latter, of collars on said shaft or axle said collars having curved outer surfaces, revoluble disks carried by the stationary plate and adapted to bear on the inner faces of the wheels and on the collars on the shaft or axle, and anti-friction rollers inserted between said stationary plate and revoluble disks, substantially as set forth.

3. The combination with a stationary plate, a shaft or axle and wheels carried by the latter, of collars carried by said shaft or axle and having curved or spherical faces, revoluble disks carried by the stationary plate and having flat or horizontal under faces adapted to bear on said collars and anti-friction rollers inserted between said stationary plate and revoluble disks, substantially as set forth.

4. The combination with a stationary plate having inclined annular groove, a shaft or axle and wheels carried by said stationary plate, of revoluble disks having flat horizontal top and bottom faces, carried by said stationary plate between the wheels, said revoluble disks being adapted to receive motion from said wheels and the shaft or axle, and tapering anti-friction rollers inserted in the groove between said stationary plate and revoluble disks, substantially as set forth.

5. The combination with a stationary plate, a shaft or axle and wheels carried by said shaft or axle, said stationary plate having annular inclining recesses in its under face, of revoluble disks carried by said stationary plate, said revoluble disks having flat top and bottom faces, and adapted to receive motion from the wheels and axle, and tapering anti-friction rollers inserted in the recesses in the under face of the stationary plate and over the revoluble disks, substantially as set forth.

6. The combination with a bolster, wheels and means for causing the weight to bear on the axles between the wheels, of bars secured to the ends of the bolster, boxes carried by the ends of said bars and having a circular interior for the reception of the ends of the axle, said axle being provided at their ends with annular grooves, and anti-friction rollers inserted in said annular grooves, said rollers being alternately of varying sizes, substantially as set forth.

In testimony whereof I have signed this specification in the presence of two subscribing witnesses.

LANSING PORTER.

Witnesses:
A. L. HEMINGWAY,
S. M. EDDY.